UNITED STATES PATENT OFFICE.

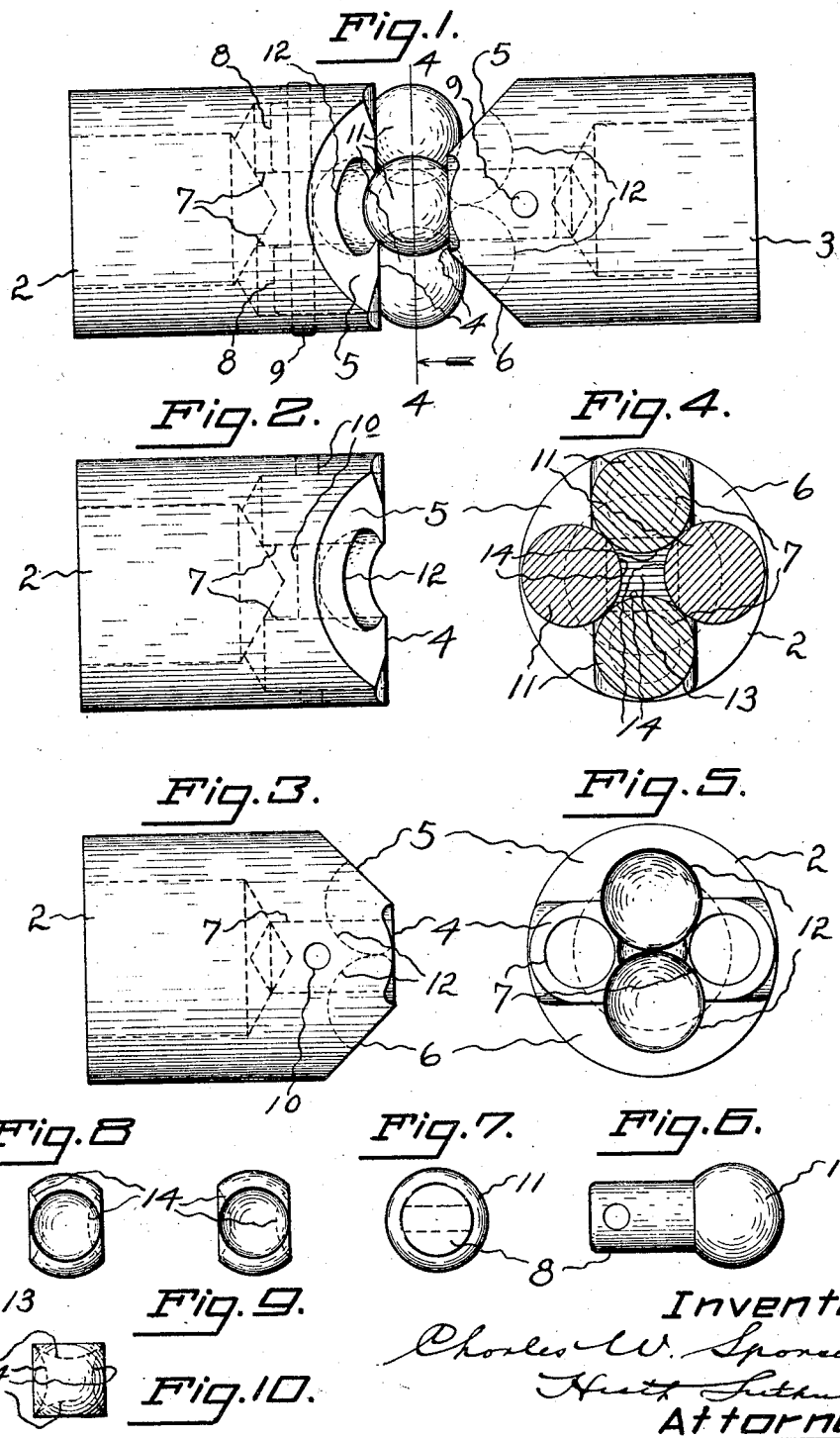

CHARLES W. SPONSEL, OF HARTFORD, CONNECTICUT, ASSIGNOR TO THE SPONSEL COMPANY, OF HARTFORD, CONNECTICUT, A CORPORATION OF CONNECTICUT.

UNIVERSAL JOINT.

1,287,778.   Specification of Letters Patent.   Patented Dec. 17, 1918.

Application filed June 17, 1918. Serial No. 240,343.

*To all whom it may concern:*

Be it known that I, CHARLES W. SPONSEL, a citizen of the United States, residing at Hartford, in the county of Hartford and State of Connecticut, have invented certain new and useful Improvements in Universal Joints, of which the following is a specification.

This invention relates to universal joints. I have several motives in view, one of them being the production of an article of the character set forth which possesses unusual strength, yet which at the same time can be inexpensively made and the parts readily and easily assembled. Another advantage is the readiness and facility with which those elements which require it can be hardened and tempered. It is also a further fact in connection with the structure that the parts can be easily machined, for instance on an automatic screw machine.

In the drawing accompanying and forming part of the present specification I have shown in detail one of the several advantageous forms of embodiment of the invention, which I will set forth fully in the following description. I am in no sense restricted to this disclosure; I may depart therefrom in several respects within the scope of the invention defined by the claims following said description.

The universal joint comprises a pair of main members which may be of any suitable nature, one generally constituting a driving member and the other a driven member. Each of these two members has two spherical surfaces opposite each other. The spherical surfaces of the respective main members are practically ninety degrees apart. In conjunction with the said main members is a coupling member which is also provided with spherical surfaces in pairs also approximately ninety degrees apart. The spherical surfaces of the main members engage the coöperating surfaces of the coupling member, and the centers of engagement of the sets of bearing surfaces are virtually in the same plane transversely of the joint. While the construction thus concisely outlined may vary decidedly, I prefer that the spherical surfaces of the main members be of convex character and obviously that those on the coupling member be concaved which by tests I have ascertained meet my conditions in an eminently desirable manner. I also prefer that those portions of the main members which are furnished with the spherical surfaces shall interengage, by reason of which features I am enabled to obtain a desirable drive from one main member to the other or vice versa.

Referring to said drawings:

Figure 1 is a side elevation of a universal joint involving my invention.

Fig. 2 is a like view of one of the main members of the joint.

Fig. 3 is a practically similar view of said main member of Fig. 2 but at right angles.

Fig. 4 is a transverse section on the line 4—4 of Fig. 1, looking in the direction of the arrow, and Fig. 5 is an inside view as seen for instance from the right in Figs. 2 and 3.

Fig. 6 is a side view of a stud and its head.

Fig. 7 is a view as seen from the left in Fig. 6.

Figs. 8, 9 and 10 are views of the coupling member.

Like characters refer to like parts throughout the several views.

As will be understood the joint comprises in its construction two main members as 2 and 3. These main members may be of any character. Practically they are in the form of shafts or shaft portions. The inner ends of these two main members are somewhat flattened as at 4 and are cut away as at 5 and 6 upon rearwardly diverging equal angles, although this clearly is a detail. Each of the said main members has in its forward end two sockets as 7 of substantially cylindrical form and opposite each other or one hundred and eighty degrees apart.

The front ends of these sockets open in the front ends of the respective main members. The sockets are adapted to receive studs or pins as 8 which are generally driven thereinto and which are held in place in some convenient way as by the keys 9 driven through openings 10 extending through the respective main members and through the respective studs or pins 8. As shown each stud or pin 8 has a spherical or globular head 11, the diameter of which is somewhat greater than that of the respective studs or pins. The main members 2 and 3 are provided with spherical cavities or pockets as 12 centrally between the spherical heads 11 thereon, the spherical cavities 12 of the member 2 receiving the heads 11 of the member 3 and conversely with respect to the member 2, these cavities 12 being made of a size to permit absolute freedom of movement of the spherical heads 11.

The coupling member is denoted in a general way by 13, and it consists virtually of a sphere having two sets of circumferential spherical pockets or cavities 14, the pockets of the respective pairs or sets being opposite to each other and at right angles to the respective pockets of the complemental set. Each spherical pocket or cavity 14 is adapted as will be understood to receive a spherical head 11. As I have already observed, it is a simple matter to assemble the parts. It can be accomplished for illustration as follows: Two spherical heads as 11 will be placed in two spherical cavities or pockets 14 of the coupling member 13 after which the studs, pins or shanks 8 of said spherical heads 11 are introduced into the sockets or bores 7 of the appropriate member 2 or 3 as the case may be, when the appropriate key 9 is driven through the openings 10 in said studs or pins 8 and in the body of the main member 2. It will, of course, be understood that the two heads or spheres 11 are introduced into opposite cavities or pockets 14 of the coupling member. When the parts are assembled as thus far described, the spherical heads 11 of the other two studs or pins 8 are seated in the remaining two other pockets or cavities 14 of the coupling member, and their studs, pins or shanks 8 are then introduced into the sockets or bores 7 of the remaining coupling member and are connected therewith by the key 9 driven in place as described in connection with the other main member.

I have noted the fact that there is between the main members of the joint a coupling member and further that this coupling member has four circumferential pockets. While this as will be evident is clearly the desirable construction for manufacturing purposes, it is not essential. The elemental point is the spherical engagement between the coupling member and parts of the main members, and this may be obtained without necessarily providing the coupling member with the four pockets, and it is also desirable that the central part or parts of the spherical engaging portions shall be intersected by a plane extending transversely of the joint. There may in fact be cases where I may not require to use either of these types of coupling member, for as to one phase of the invention it broadly contemplates the provision of any character of coupling member by which the described relative movement of the main members is permitted, and wherein these main members are forked and also wherein the branches of the forks are in lateral engagement. This lateral engagement secures as I have practically stated the most desirable drive transmission from one main member to the other of the joint. The forking of the main members I obtain by the provision of the spherically headed studs.

What I claim is:

1. A universal joint comprising a pair of main members, each having two spherical surfaces opposite each other, the spherical surfaces of the respective main members being approximately ninety degrees apart, and a coupling member also provided with spherical surfaces in pairs also approximately ninety degrees apart, the spherical surfaces of the main members engaging the coöperating surfaces of the coupling member and the centers of engagement of the sets of bearing surfaces being approximately in the same plane transversely of the joint.

2. A universal joint comprising a pair of main members, each having two spherical surfaces opposite each other, the spherical surfaces of the respective main members being approximately ninety degrees apart, and a coupling member also provided with spherical surfaces in pairs also approximately ninety degrees apart, the spherical surfaces of the main members engaging the coöperating surfaces of the coupling member and the centers of engagement of the sets of bearing surfaces being approximately in the same plane transversely of the joint, those parts of said main members furnished with said spherical surfaces being interengaged.

3. A universal joint comprising a pair of main members each having two spherical convex surfaces opposite each other, the spherical surfaces of the respective main members being approximately ninety degrees apart, and a coupling member also provided with spherical concaved surfaces in pairs also approximately ninety degrees apart, the spherical surfaces of the main members engaging the coöperating surfaces of the coupling member and the centers of engagement of the sets of bearing surfaces being practically in the same plane transversely of the joint.

4. A universal joint comprising a pair of shaft members, each member having two spherical surfaces, a coupling member having four correspondingly spherical concaved surfaces at right angles to one another and engaged respectively by the spherical surfaces of the shaft members, the spherical portions of one shaft member contacting the spherical portions of the other shaft member, and the centers of engagement of the spherical surfaces being approximately in the same plane transversely of the joint.

5. A universal joint comprising a pair of main members having sockets opposite each other, studs rigidly fitted in said sockets and provided with spherical heads at their outer ends, the spherical heads of the respective main members being approximately ninety degrees apart, and a coupling member provided with spherical concaved surfaces in pairs also approximately ninety degrees apart, the spherical surfaces of the studs engaging the coöperating surfaces of the coupling member and the centers of engagement of the respective bearing surfaces being approximately in the same plane transversely of the joint.

In testimony whereof I affix my signature in the presence of two witnesses.

CHARLES W. SPONSEL.

Witnesses:
L. L. MARKEL,
HEATH SUTHERLAND.

Copies of this patent may be obtained for five cents each, by addressing the "Commissioner of Patents, Washington, D. C."